United States Patent [19]
Vinegar et al.

[11] Patent Number: 5,392,854
[45] Date of Patent: Feb. 28, 1995

[54] OIL RECOVERY PROCESS

[75] Inventors: Harold J. Vinegar; Eric P. De Rouffignac; Carlos A. Glandt; Thomas Mikus; Mark A. Beckemeier, all of Houston, Tex.

[73] Assignee: Shell Oil Company, Houston, Tex.

[21] Appl. No.: 169,800

[22] Filed: Dec. 20, 1993

Related U.S. Application Data

[63] Continuation-in-part of Ser. No. 896,864, Jun. 12, 1992, Pat. No. 5,297,626.

[51] Int. Cl.⁶ ............... E21B 43/24; E21B 43/247; E21B 36/02; E21B 43/30
[52] U.S. Cl. .................... 166/271; 166/59; 166/245; 166/272
[58] Field of Search ........... 166/271, 259, 272, 245, 166/59, 256, 260, 251

[56] References Cited

U.S. PATENT DOCUMENTS

| | | | |
|---|---|---|---|
| 2,902,270 | 9/1959 | Salomonsson et al. | 166/302 |
| 2,914,309 | 11/1959 | Salomonsson | 166/245 |
| 2,923,535 | 2/1960 | Ljungstrom | 166/256 |
| 3,095,031 | 6/1963 | Eurenius et al. | 158/99 |
| 3,113,623 | 12/1963 | Krueger | 166/59 |
| 3,180,748 | 4/1965 | Holmgren et al. | 106/104 |
| 3,181,613 | 5/1965 | Krueger | 166/300 |
| 3,507,332 | 4/1970 | Venable, Jr. et al. | 166/292 |
| 3,880,235 | 4/1975 | Berry et al. | 166/302 |
| 4,079,784 | 3/1978 | Howard et al. | 166/251 |
| 4,137,968 | 2/1979 | Howard et al. | 166/53 |
| 4,640,352 | 2/1987 | Vanmeurs et al. | 166/245 |
| 4,886,118 | 12/1989 | Van Meurs et al. | 166/245 |
| 5,060,287 | 10/1991 | Van Egmond | 392/301 |
| 5,065,818 | 11/1991 | Van Egmond | 166/60 |
| 5,082,055 | 1/1992 | Hemsath | 166/272 |
| 5,226,961 | 7/1993 | Nahm et al. | 106/692 |
| 5,255,742 | 10/1993 | Mikus | 166/303 |
| 5,339,897 | 8/1994 | Leaute | 166/245 |

FOREIGN PATENT DOCUMENTS 123137 11/1948 Sweden .

OTHER PUBLICATIONS

"Under Ground Shale Oil Pyrolysis According to the Ljunstroem Method," Chief Engineer Goesta Salomonsson, IVA, vol. 24 (1953), No. 3, pp. 118–123.

*Primary Examiner*—Stephen J. Novosad
*Attorney, Agent, or Firm*—Del S. Christensen

[57] ABSTRACT

A process to recover oil is provided wherein an oil containing subterranean formation is heated by conductive heat transfer. The high temperature levels of this process result in high recoveries of initial oil in place, and recovery of the oil within a short time period. This process is particularly applicable to diatomite formations that have low permeabilities.

20 Claims, 4 Drawing Sheets

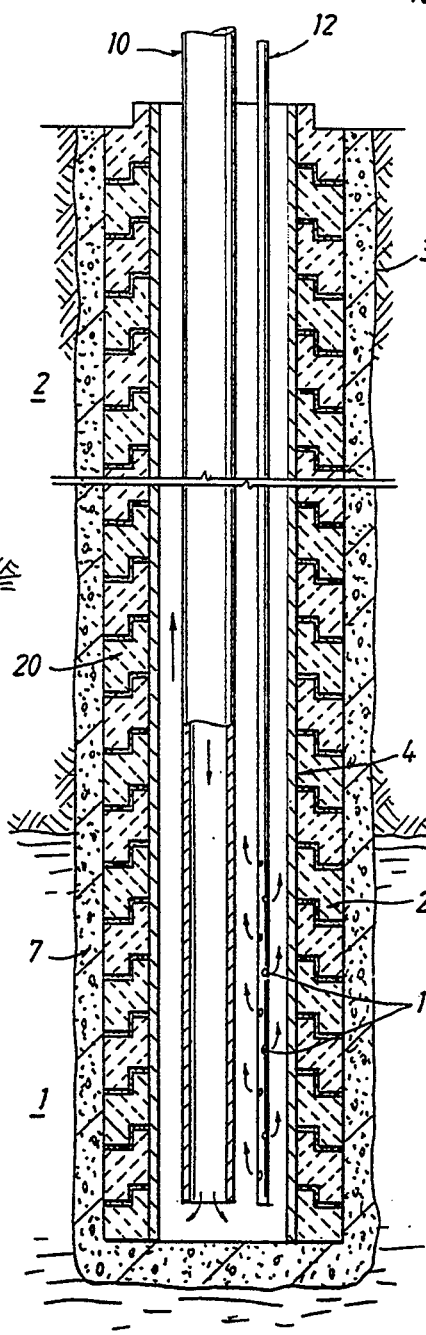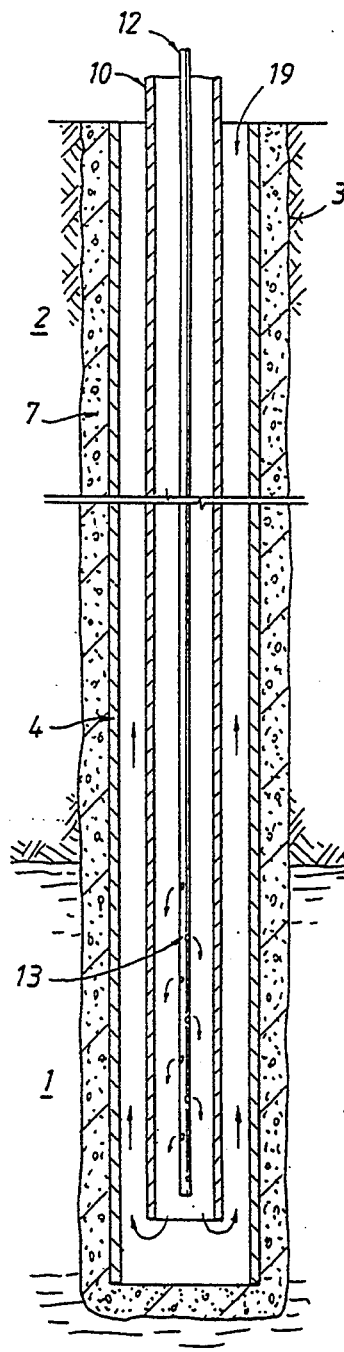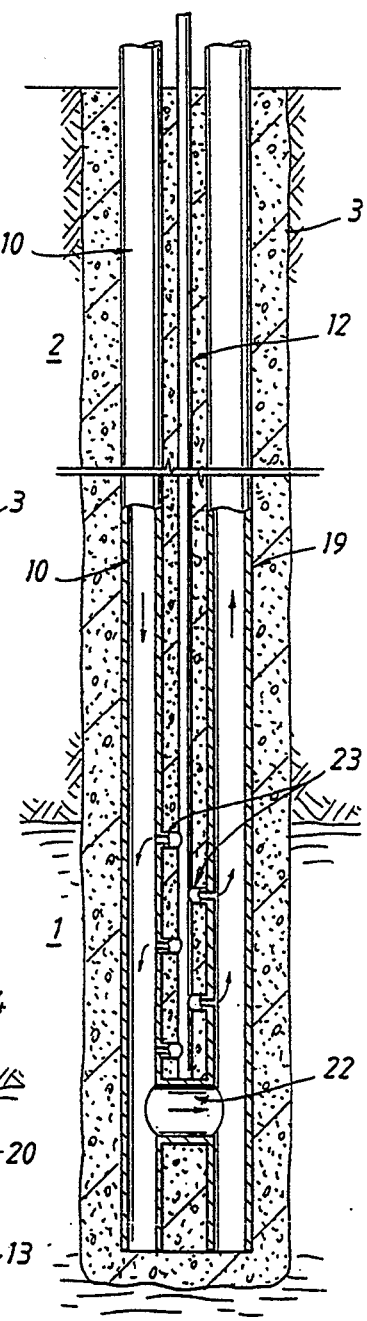

000

OIL RECOVERY PROCESS

RELATED PATENTS

This patent is a continuation-in-part of U.S. Pat. No. 5,297,626, (application Ser. No. 896,864, filed Jun. 12, 1992) and is related to U.S. Pat. Nos. 5,255,742, and 5,226,961, the disclosures of which are incorporated herein by reference.

FIELD OF THE INVENTION

This invention relates to an improved method and apparatus for recovering hydrocarbons from hydrocarbon containing subterranean diatomite formations or shallow oil shale formations.

BACKGROUND OF THE INVENTION

U.S. Pat. Nos. 4,640,352 and 4,886,118 and "Under Ground Shale Oil Pyrolysis According to the Ljunstroem Method", Chief Engineer Goesta Salomonsson, IVA, vol. 24 (1953), no. 3, pp 118–123 disclose conductive heating of subterranean formations that contain hydrocarbons to recover hydrocarbons therefrom. Conductive heating is particularly applicable to low permeability formations such as diatomites, porcelainite, coal, oil shales and other source rocks. Formations of low permeability are not amenable to oil recovery methods that require injection of fluids into the formation such as steam, carbon dioxide, or fire flooding because flooding materials tend to penetrate formations having low permeability preferentially through fractures. The injected fluids bypass most of the formation hydrocarbons. In contrast, conductive heating does not require fluid transport into the formation. Formation hydrocarbons are therefore not bypassed as in a flooding and in-situ combustion process. When the temperature of a formation is increased by conductive heating, vertical temperature profiles will tend to be relatively uniform because formations generally have relatively uniform thermal conductivities and specific heats. Production of oil in a thermal conduction process is by pressure drive, vaporization and thermal expansion of oil and water trapped within the pores of the formation rock. Oil migrates through small fractures created by the expansion and vaporization of the oil and water.

Patent '352 discloses 600° C. to 900° C. as a preferred temperature range for heat injection for the thermal conduction process. Electrical resistance is disclosed as a preferred heat source for the thermal conduction process. The process described in the Salomonsson article uses electrical resistance heat injectors and a heat injection rate of about 240 watts per foot. This rate of heat input would result in an injection temperature within the temperature range of about 600° C. to 900° C.

This heat conduction process has been known for a relatively long time, yet is not presently practiced economically. Commercial applications are not economical mainly due to the long time period required to produce hydrocarbons with a reasonable number of wells. A sufficient amount of capital can not be justified by oil production that will not be realized for such a long time period.

The high cost of electrical energy is also an impediment to commercial projects using these prior art methods. Conversion of hydrocarbons to electrical energy is typically accomplished at only about 35 percent efficiency and requires a considerable capital investment. Typically, burning hydrocarbons directly lowers energy costs considerably.

Gas fired heaters which are intended to be useful for injection of heat into subterranean formations are disclosed in U.S. Pat. No. 2,902,270 and Swedish Patent No. 123,137. These burners utilize flames to combust fuel gas. The existence of flames results in hot spots within the burner and in the formation surrounding the burner. A flame typically provides a 1650° C. radiant heat source. Materials of construction that can withstand the temperatures of these hot spots are relatively expensive. The heaters are, therefore, more expensive than a comparable heater without flames. The heater of Swedish Patent 123,137 would appear to result in flameless combustion such as the present invention if the combustion air and the fuel gas were heated to a temperature above the autoignition temperature of the mixture. But due to the shallow depths of the heat injection wells disclosed in that patent, the components do not appear to be heated sufficiently to result in flameless combustion. At burner temperatures above about 900° C. about 100 feet of wellbore would be sufficient to preheat the combustion air and the fuel gas for flameless combustion. Further, radiant heat transfer from the flames appears to be critical in obtaining the temperature profile indicated in FIG. 2 of the Swedish patent because little heat would be transferred from the wellbore to the formation above the portion of the borehole containing flames. Due to the existence of flames, the service life and the operating temperatures of these burners are limited.

FIG. 2 of the Swedish patent shows a temperature profile within the heat injector wellbore, but the nature of radiant heat transfer would not result in a uniform temperature profile such as this. The temperature of the casing would be significantly greater at points close to the flames. The average temperature of the heat injector would therefore realistically be considerably lower than the metallurgical limits of the well materials.

U.S. Pat. Nos. 3,113,623 and 3,181,613 disclose gas fired heat injection burners for heating subterranean formations. These burners utilize porous materials to hold a flame and thereby spreading the flame out over an extended length. Radiant heat transfer from a flame to the casing is avoided by providing the porous medium to hold the flame. But for combustion to take place in the porous medium, the fuel gas and the combustion air must be premixed. If the premixed fuel gas and combustion air were at a temperature above the autoignition temperature of the mixture, they would react upon being premixed instead of within the porous medium. The formations utilized as examples of these inventions are only up to fifty feet thick and below only about fifteen feet of overburden. The fuel gas and the combustion air are therefore relatively cool when they reach the burner. The burner would not function as it was intended if the formation being heated were significantly thicker or buried under significantly more overburden.

Natural gas fired well heaters that are useful for heating formations to temperatures sufficient for ignition of in-situ fire floods are disclosed in U.S. Pat. Nos. 2,923,535; 3,095,031; 3,880,235; 4,079,784; and 4,137,968. Provisions for the return of combustion gases to the surface are not required for ignition of fire floods. The combustion gases are intended to be injected into the formation. A long service life is also not required due to the short time period during which the burner is needed. The fuel gas and combustion air also remain relatively cool as they go down a borehole toward the burner because they are not exposed to upward flows of hot combustion products. These burners are, therefore, not suitable for use as heat injectors, and do not overcome the shortcomings of the prior art heat injector burners.

It is, therefore, an object of the present invention to provide a method to recover hydrocarbons from a hydrocarbon containing formation using a conductive heat transfer. It is another object to provide such a process wherein more than about 75 percent of the original oil in place may be recovered. In a preferred embodiment it is an object to provide such a process which is capable of recovering hydrocarbon from a formation having a low permeability such as oil shale or diatomite.

SUMMARY OF THE INVENTION

These and other objects are accomplished by a method comprising the steps of: providing heat injection means extending essentially through a hydrocarbon-containing subterranean formation; providing a plurality of production wells extending into the hydrocarbon-containing subterranean formation; fracturing the formation from the production wells; injecting heat into the formation from the heat injection means thereby driving hydrocarbons away from the heat injection means and toward the production wells; and producing from the production wells hydrocarbons that have been driven away from the heat injection means wherein the heat injection means comprise a plurality of heat injection wellbores provided along a plane perpendicular to the minimum formation stress, and the plurality of oil production wells are provided on each side of the plane which contains the heat injection wellbores.

The process of this invention utilizes a high temperature front moving uniformly through the formation. The high temperature front will vaporize connate water, water flood residual water and oil, creating what is essentially a steam drive using in-situ generated steam. The steam drive is vertically uniform due to the generation of the steam by the uniform high temperature front. Recovery of original oil in place is high as a result of the absence of significant fingering such as that which occurs in fluid injection processes. The high temperature of the present injectors, along with the uniform temperature, permits injection of heat at a rate which results in production of oil significantly faster than injection of heat at prior art temperature levels.

In a preferred embodiment of the present invention, the hydrocarbon containing formation is a hydrocarbon containing diatomite formation. Diatomite formations include porcelanite type formations such as the Monterey formation in California. Diatomite formations have high porosity but low initial permeabilities. The formations are hydraulically fractured from the production wells, significantly reducing the number of production wells required to drain the formation. The heat injection means are preferably arranged between production wells in rows that are approximately perpendicular to the direction of the minimum principle stress of the formation and the formation is fractured from the production well. Production proceeds as a line drive from the rows of heat injector wells to the fractures of the production wells.

The process of the present invention can also advantageously be applied to formations having significant permeabilities. For example, a thick deposit of tar sands may advantageously be subjected to the process of the present invention. Formations such as oil shale formations that have no initial permeability but tend to develop permeability by fracturing and pyrolysis of solids upon heating may also be subjected to the present process.

BRIEF DESCRIPTION OF THE DRAWINGS

FIGS. 1 through 5 show burners suitable for use in the present invention.

DETAILED DESCRIPTION OF THE INVENTION

The heat injection means of the present invention may be any means capable of operation continuously for extended time periods at injection temperatures preferably above about 900° C. and more preferably above about 1000° C. Gas fueled burners utilizing flameless combustion are preferred. Gas, particularly methane, is a clean fuel. Use of a clean fuel is essential for long term continuous operation. Flameless combustion maximizes the temperature level at which heat may be injected for any given materials of construction. Gas is also an economical fuel, and inherently less expensive than electricity.

Injectors utilizing flameless combustion of fuel gas at temperature levels of about 900° C. to about 1100° C. may be fabricated from high temperature alloys such as, for example, "INCONEL 617", "INCOLOY 800HT", "INCOLOY 601", "HASTELLOY 235", "UDIMET 500" and "INCOLOY DS". At higher temperatures ceramic materials are preferred. Ceramic materials with acceptable strength at temperatures of 900° C. to about 1400° C. are generally high alumina content ceramics. Other ceramics that may be useful include chrome oxide, zirconia oxide, and magnesium oxide based ceramics. National Refractories and Minerals, Inc., Livermore, Calif.; A. P. Green Industries, Inc., Mexico, Mo.; and Alcoa, Alcoa Center, Pa., provide such materials.

Generally, flameless combustion is accomplished by preheating combustion air and fuel gas sufficiently that when the two streams are combined the temperature of the mixture exceeds the auto ignition temperature of the mixture, but to a temperature less than that which would result in the oxidation upon mixing being limited by the rate of mixing. Preheating of the streams to a temperature between about 850° C. and about 1400° C. and then mixing the fuel gas into the combustion air in relatively small increments will result in flameless combustion. The increments in which the fuel gas is mixed with the combustion gas stream preferably result in about a 20° C. to 100° C. temperature rise in the combustion gas stream due to the combustion of the fuel.

Figure 1:
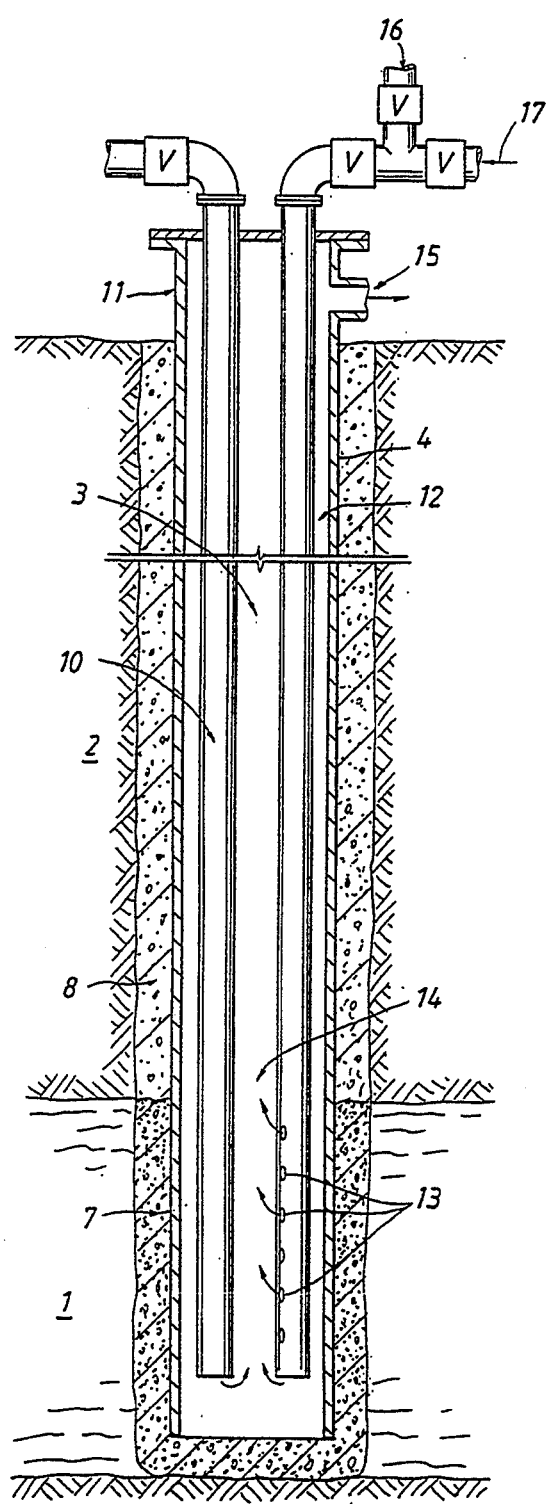

Referring to FIG. 1, a heat injection well and burner capable of carrying out the present invention are shown. A formation to be heated, 1, is below an overburden, 2. A wellbore, 3, extends through the overburden and to near the bottom of the formation to be heated. In the embodiment shown in FIG. 1, the wellbore is cased with a casing, 4. The lower portion of the wellbore may be cemented with a cement, 7, having characteristics suitable for withstanding elevated temperatures and transferring heat. A cement which is a good thermal insulator, 8, is preferred for the upper portion of the wellbore to prevent heat loss from the system. A combustion air conduit, 10, extends from the wellhead, 11 to the lower portion of the wellbore. A fuel gas conduit, 12, also extends from the wellhead to the bottom of the wellbore.

High temperature cements suitable for cementing casing and conduits within the high temperature portions of the wellbore are available. Examples are disclosed in U.S. Pat. Nos. 3,507,332 and 3,180,748. Alumina contents above about 50 percent by weight based on cements slurry solids are preferred.

Thermal conductivity of these cements can be increased by including graphite in the cement slurry. Between about 10 and about 50 percent by weight of graphite will result in a significant improvement in thermal conductivity. Cement slurries that contain graphite are also of a significantly lower density than high alumina slurries and generally are less expensive than high alumina slurries. The lower density slurry enables conventional cementing of wellbores whereas heavier slurries often required staged cementing. Staged cementing requires considerable rig time and can result in discontinuities in the set cement.

Graphite containing cements are not particularly strong, and are therefore not preferred when high strength is required. When a substantial casing is utilized, high strength cement is not required and high graphite cement is preferred.

Choice of a diameter of the casing, 4, in the embodiment of FIG. 1 is a trade off between the expense of the casing, and the rate at which heat may be transferred into the formation. The casing, due to the metallurgy required, is generally the most expensive component of the injection well. The heat that can be transferred into the formation increases significantly with increasing casing diameter. A casing of between about 4 and about 8 inches in internal diameter will typically provide an acceptable trade-off between initial cost and heat transfer. The casing, 4, could optionally be provided with means to provide communication between the outside of the casing and the inside of the casing after the well is brought up to operating temperatures. Such means would relieve pressure from the outside of the casing. These pressures are generated by formation gases that permeate the cement. Relieving these pressures could permit the use of thinner walled casings. Means to provide communication may be, for example, partially milled portions which fail at operation temperatures and pressures, or plugs of aluminum or polymers that melt or burn at service temperature and pressure. The plugs or milled portions would serve to keep cement out of the casing while the casing is being cemented into place.

The fuel gas conduit contains a plurality of orifices, 13, (six shown) along the length of the conduit within the formation to be heated. The orifices provide communication between the fuel gas conduit and the combustion air conduit. A plurality of orifices provide for distribution of heat release within the formation to be heated. The orifices can be sized to accomplish a nearly even temperature distribution within the casing. A nearly even temperature profile within the casing results in more uniform heat distribution within the formation to be heated. A nearly uniform heat distribution within the formation will result in more efficient utilization of heat in a conductive heating hydrocarbon recovery process. A more even temperature profile will also result in the lower maximum temperatures for the same heat release. Because the materials of construction of the burner and well system dictate the maximum temperatures, even temperature profiles will increase the heat release possible for the same materials of construction.

Alternatively, it may be advantageous to vary the temperature profile within a wellbore to match operating limits which vary with depth. For example, suspended alloy tubes could withstand greater temperatures near the bottom due to the bottom portions supporting less weight. Designing the burner to take advantage of varying limitations may result in greater heat input into the formation and therefore more rapid recovery of hydrocarbons.

The number of orifices is limited only by size of orifices which are to be used. If more orifices are used, they must generally be of a smaller size. Smaller orifices will plug more easily than larger orifices. The number of orifices is a trade-off between evenness of the temperature profile and the possibility of plugging.

Alternatively, air could be staged into fuel gas by providing orifices in the combustion air conduit instead of the fuel conduit.

Fuel gas and combustion air transported to bottom of the wellbore combine and react within the wellbore volume surrounding the conduits, 14, forming combustion products. The combustion products travel up the wellbore and out an exhaust nozzle, 15, at the wellhead. From the exhaust nozzle, the combustion products may be routed to atmosphere through an exhaust stack (not shown). Alternatively, the combustion gases may be treated to remove pollutants. Energy recovery from the combustion products by an expander turbine or heat exchanger may also be desirable.

As the combustion products rise in the wellbore above the formation being heated, they exchange heat with the combustion air and the fuel gas traveling down the flow conduits. This heat exchange not only conserves energy, but permits the desirable flameless combustion of the present invention. The fuel gas and the combustion air are preheated as they travel down the respective flow conduits sufficiently that the mixture of the two streams at the ultimate mixing point is at a temperature above the autoignition temperature of the mixture. Flameless combustion results, avoiding a flame as a radiant heat source. Heat is therefore transferred from the wellbore in an essentially uniform fashion.

The preheating of the fuel gases to obtain flameless combustion would result in significant generation of carbon within the fuel gas conduit unless a carbon formation suppressant is included in the fuel gas stream. Nozzles for injection of fuel gas and oxidant suppressant are shown in FIG. 1 as 16 and 17, respectively. The carbon formation suppressant may be carbon dioxide, steam, hydrogen or mixtures thereof. Carbon dioxide and steam are preferred due to the generally higher cost of hydrogen.

Carbon is formed from methane at elevated temperatures according to the following reaction:

$$CH_4 \rightarrow C + 2H_2$$

This reaction is a reversible reaction, and hydrogen functions as carbon formation suppressant by the reverse reaction.

Carbon dioxide suppresses carbon formation by the following reaction:

$$CO_2 + C \rightarrow 2CO$$

Steam suppresses carbon formation by the following reactions:

$$H_2O + C \rightarrow CO + H_2$$

$$2H_2O + C \rightarrow CO_2 + 2H_2$$

The carbon dioxide and the carbon monoxide remain in equilibrium at elevated temperatures according to the shift gas reaction:

$$CO + H_2O \rightleftharpoons CO_2 + H_2$$

When the fuel gas is essentially methane, a molar ratio of about 1:1 of steam to methane will be sufficient to suppress carbon formation to temperatures of about 2500° F. (1371° C.) and a molar ratio of about 1.15:1 of carbon dioxide to methane is sufficient to suppress carbon formation. The molar ratios of steam to methane is preferably within the range of about 1:1 to about 2:1 when steam is utilized as the carbon formation suppressant. The molar ratio of carbon dioxide to methane is preferably within the range of about 1:1 to about 3:1 when carbon dioxide is utilized as the carbon formation suppressant. The fuel gas preferably consists essentially of methane due to methane being more thermally stable than other light hydrocarbons. The suppressant is additionally beneficial because it lowers combustion rates and reduces peak temperatures.

Figure 2:
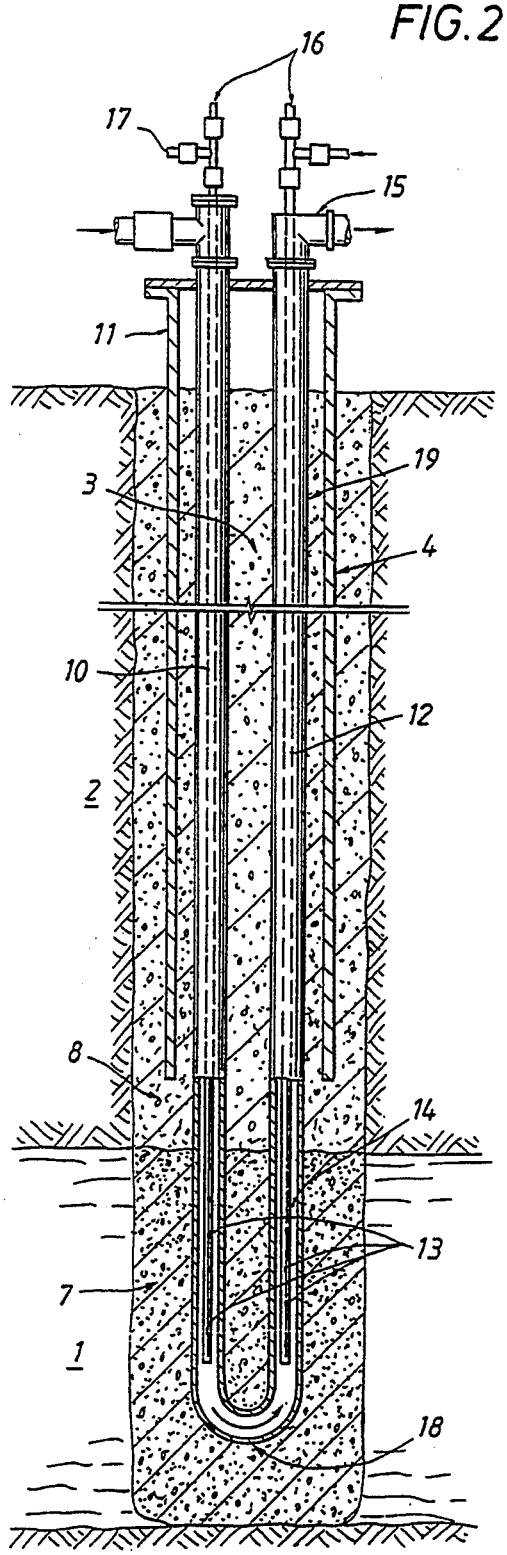

Referring now to FIG. 2, an alternative apparatus capable of carrying out the present invention is shown with like elements numbered as in FIG. 1. In the embodiment of FIG. 2, the combustion products rise to the surface through a separate conduit, 19, rather than through the wellbore surrounding the air conduit, 10. The combustion product return conduit and the combustion air conduit are separate conduits connected at the bottom of the wellbore by a cross-over, 18. Fuel gas is provided through a fuel gas conduit, 12, within the combustion product return conduit, 19, and the combustion air conduit, 10. Alternatively, a single fuel gas conduit could be used within either the combustion air conduit or the combustion product return conduit. The combustion return conduit and the combustion air conduit are cemented directly into the formation to be heated, 2, by a high temperature cement, 7. If the combustion air and combustion gases conduits are thick enough to not require significant support from the cement, a graphite containing cement can be utilized. This configuration should be considerably less expensive to provide due to the absence of a large diameter casing within the high temperature portion of the wellbore. The two smaller conduits, when separated laterally within the wellbore, can transfer heat into the formation more effectively than a single conduit having the same surface area.

The flow conduits may be made from steel, high temperature alloys such as "INCONEL" or "IN-COLOY" or ceramics, depending upon the operating temperatures and service life desired. Ceramics are preferred as a material of construction for casings and flow conduits of the present invention when injection of heat at temperature levels above about 1100° C. are desired.

Referring to FIG. 3, with elements numbered as in FIG. 1, a preferred embodiment utilizing metal alloy flow conduits is shown. The formation to be heated, 1, below an overburden, 2, is shown penetrated by a wellbore, 3, of about twelve inches in diameter. In this embodiment, the wellbore is cased with a sacrificial casing, 4, made of a material such as carbon steel or stainless steel. Stainless steel, although significantly more expensive than carbon steel, is preferred when diatomite formations are subjected to the present invention because the stainless steel will provide support for the surrounding diatomite until the diatomite has at least partially sintered and therefore increased in strength.

The casing is about eight inches in diameter. The casing is cemented into place using a high temperature cement, 7, which forms an outer perimeter of the flow channel through which combustion gases travel up the wellbore. The cement is preferably one such as "PERMACON", a high alumina cement available from National Refractories, Inc. A combustion air conduit, 10, in this embodiment is made from an alloy such as "INCONEL 617" and is centralized within the casing. The combustion air conduit could be, for example, a three to four inch diameter tube. A fuel gas conduit, 12, is centralized within the combustion air conduit. The fuel gas conduit can be made from an alloy such as "INCONEL 617" and could be about three quarters of an inch in diameter. Combustion occurs in the annulus between the fuel gas conduit, and the combustion air conduit, 12. At the lower end of the formation to be heated, within the wellbore, the combustion air conduit is in communication with the annulus between the combustion air conduit, 10, and the casing. This annulus provides a flow path for combustion products to travel back up the wellbore to the surface.

The embodiment of FIG. 3 provides for conventional centralization of the flow conduits, and conventional replacement of the fuel gas line and combustion air line if such replacement becomes necessary.

Referring now to FIG. 4, with elements numbered as in FIG. 1, a preferred embodiment of a burner is shown utilizing stacked annular shaped ceramic bricks to form a combustion gas flow conduit. A wellbore, 3, is shown extending into a formation to be heated, 1, under an overburden, 2. A casing of a sacrificial material, 4, is utilized to initially hold the ceramic bricks, 20, in place. The ceramic bricks can be about three inches wall thickness and each about five to ten feet in height. The bricks may be made of a high alumina ceramic material, and may be sealed together with a high alumina mortar. A combustion air conduit, 10, provides a flow path for combustion air to the lower portion of the formation to be heated. The combustion air conduit is open and in communication with the annulus between the combustion air conduit and the ceramic bricks near the bottom of the formation to be heated. A fuel gas conduit, 12, directs fuel gas into the volume defined by the casing in increments through orifices, 13, to provide for oxidation of the fuel gas in relatively small increments. The fuel gas conduit and the combustion air conduit may be ceramic if operating temperatures are to be above about 1100° C. If operating temperatures are to be about 1100° C. or less, the flow conduits can be an alloy such as "INCONEL 617". The ceramic bricks are typically cemented into place within the wellbore with a high temperature cement and preferably a graphite containing high alumina cement.

Referring now to FIG. 5, another embodiment of a preferred heat injector is shown with elements numbered as in FIG. 1. This embodiment is preferred when the heat injector is to be injecting heat at temperatures of about 1100° C. to about 1371° C. In this embodiment, the combustion air conduit, 10, the combustion gas conduit, 19, and the fuel gases are all initially sacrificial materials cemented into place. The cement is a high temperature cement. A high graphite content cement is not preferred in this embodiment due to the lower strength of the high graphite cements. A channel, 22, near the bottom of the formation to be heated provides communication between the combustion air conduit and the combustion gas conduit. Communication between the fuel gas conduit, 12, and the combustion gas conduit and the combustion air conduit is provided through conduits such as noble metal tubes such as platinum or platinum-plated tungsten, 23, that may contain orifices (not shown) to restrict flow of fuel gas into the larger flow conduits. Combustion of the fuel gas occurs both in the down flow combustion air conduit, 10, and in the up flow combustion gases conduit, 19. Within the formation to be heated, 1, the combustion gas and the combustion air conduit are spaced as far apart as practical in order to maximize the amount of heat which can be transferred to the formation at any maximum operating temperature.

The embodiment of FIG. 5 could include a ceramic fuel gas conduit or a sacrificial conduit which is eliminated prior to or during initial operation, leaving the cement defining a conduit. The sacrificial conduit may be eliminated by, for example, oxidation, melting, or milling. A plurality of fuel gas conduits could optionally be provided. A plurality of fuel gas conduits could provide redundancy, and could reduce the total length of tubes, 23, which are required. In the embodiment of FIG. 5, the wellbore, 3, could be of about a sixteen inch diameter within the formation to be heated, and contain about a three to four inch internal diameter combustion air conduit, a combustion gas conduit of about three to about four inch diameter, and one or preferably two fuel gas conduits of about three quarters inch diameter. Orifices in the alloy tubes, 23, are sized to achieve a fuel gas flow that would result in a nearly uniform temperature profile within the wellbore.

When ceramic materials are utilized for construction of the heat injectors, the larger conduits (combustion air and combustion product conduits) may initially be sacrificial materials such as polymeric, fiberglass, carbon steel or stainless steel. The sacrificial conduits can be cemented into place using high alumina cements. The high alumina cement forms the conduit which remains in place after the sacrificial materials are removed.

High alumina ceramic tubes are available that have tensile strength sufficient to permit suspension of the conduits from a rig at the surface. These ceramic conduits can be lowered into the wellbore as sections are added at the surface. The sections can be joined by mortar and held together by sacrificial clamps until the mortar has cured. The ceramic tubes could also be held in place by sacrificial pipes until they are cemented into place.

Cold start-up of a well heater of the present invention may utilize combustion with a flame. Initial ignition may be accomplished by injecting pyrophoric material, an electrical igniter, a spark igniter, or temporarily lowering an electric heater into the wellbore. The burner is preferably rapidly brought to a temperature at which a flameless combustion is sustained to minimize the time period at which a flame exists within the wellbore. The rate of heating up the burner will typically be limited by the thermal gradients the burner can tolerate.

Flameless combustion generally occurs when a reaction between an oxidant stream and a fuel is not limited by mixing and the mixed stream is at a temperature higher than the autoignition temperature of the mixed stream. This is accomplished by avoiding high temperatures at the point of mixing and by mixing relatively small increments of fuel into the oxidant containing stream. The existence of flame is evidenced by an illuminate interface between unburned fuel and the combustion products. To avoid the creation of a flame, the fuel and the oxidant are preferably heated to a temperature of between about 815° C. and about 1371° C. prior to mixing. The fuel is preferably mixed with the oxidant stream in relatively small increments to enable more rapid mixing. For example, enough fuel may be added in an increment to enable combustion to raise the temperature of the stream by about 10° C. to about 38° C. Although gas fueled burners are preferred, electrical resistance heaters could also be utilized to achieve the 900° C. or higher heat injection temperatures of the present invention. Electrical heating elements such as nickel and chromium alloys could be utilized. Alternatively, a high graphite cement could be used, and the cement could be utilized as a resistance element.

Figure 6:
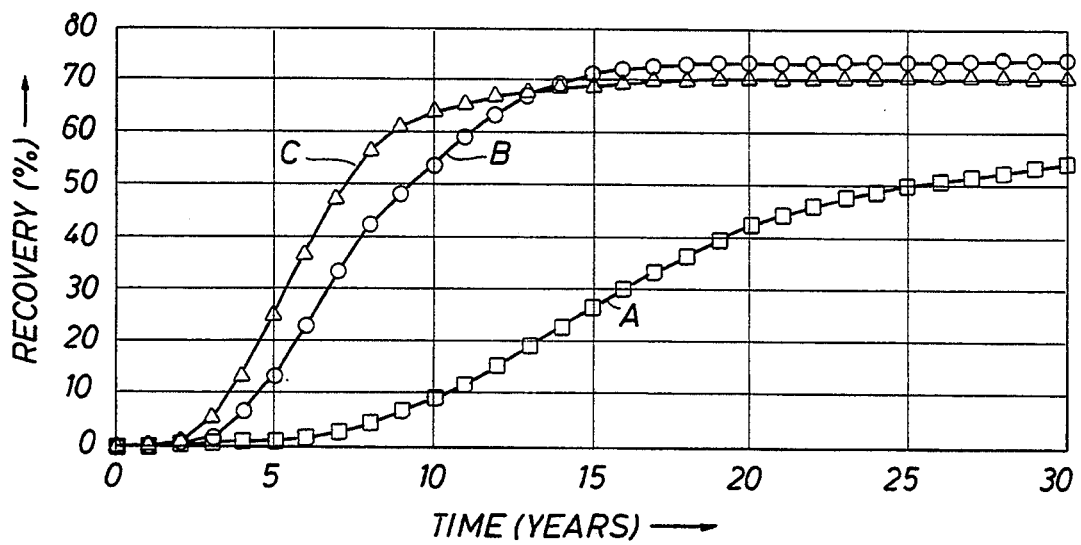
FIG. 6 is a plot of calculated oil recoveries as a function of time for three different temperature levels of heat injection from a hypothetical diatomite formation.
Figure 7:
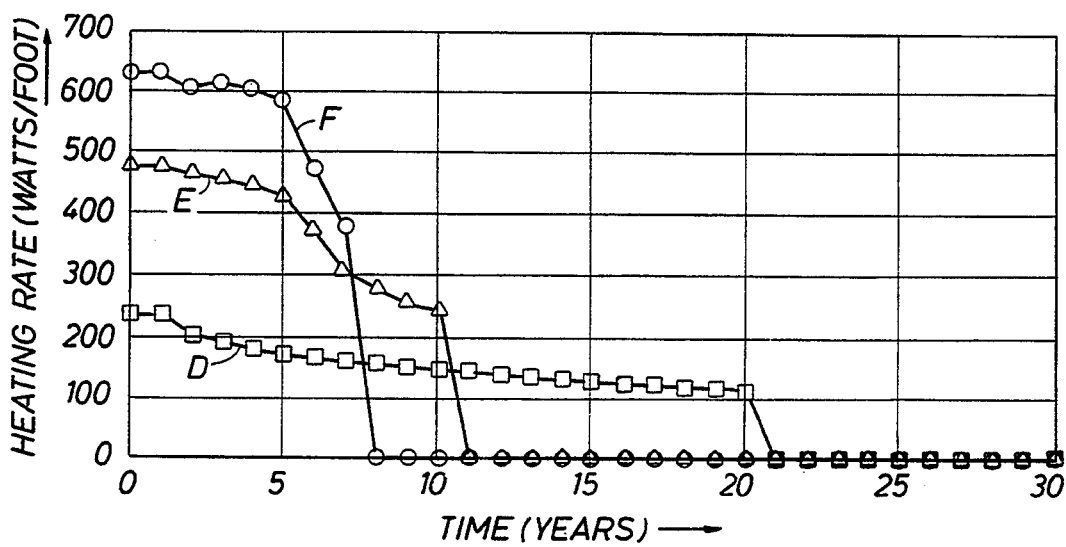
FIG. 7 is a plot of the rate of heat injection to achieve each of the temperature levels of FIG. 6.

FIGS. 6 and 7 demonstrate the importance of injecting heat at a high temperature level in a conductive heating oil recovery process. FIGS. 6 and 7 are, respectively, oil production projections and heat injection rates as a function of time for heat injector temperature levels of 815° C. (1500° F.), 1093° C. (2000° F.) and 1371° C. (2500° F.). In FIG. 6, oil recovery for temperature levels of 1500° F., 2000° F. and 2500° F. are shown as lines A, B and C respectively. In FIG. 7, heat injection rates for temperature levels of 815° C., 1093° C. and 1371° C. are shown as lines D, E and F respectively.

Figure 8:
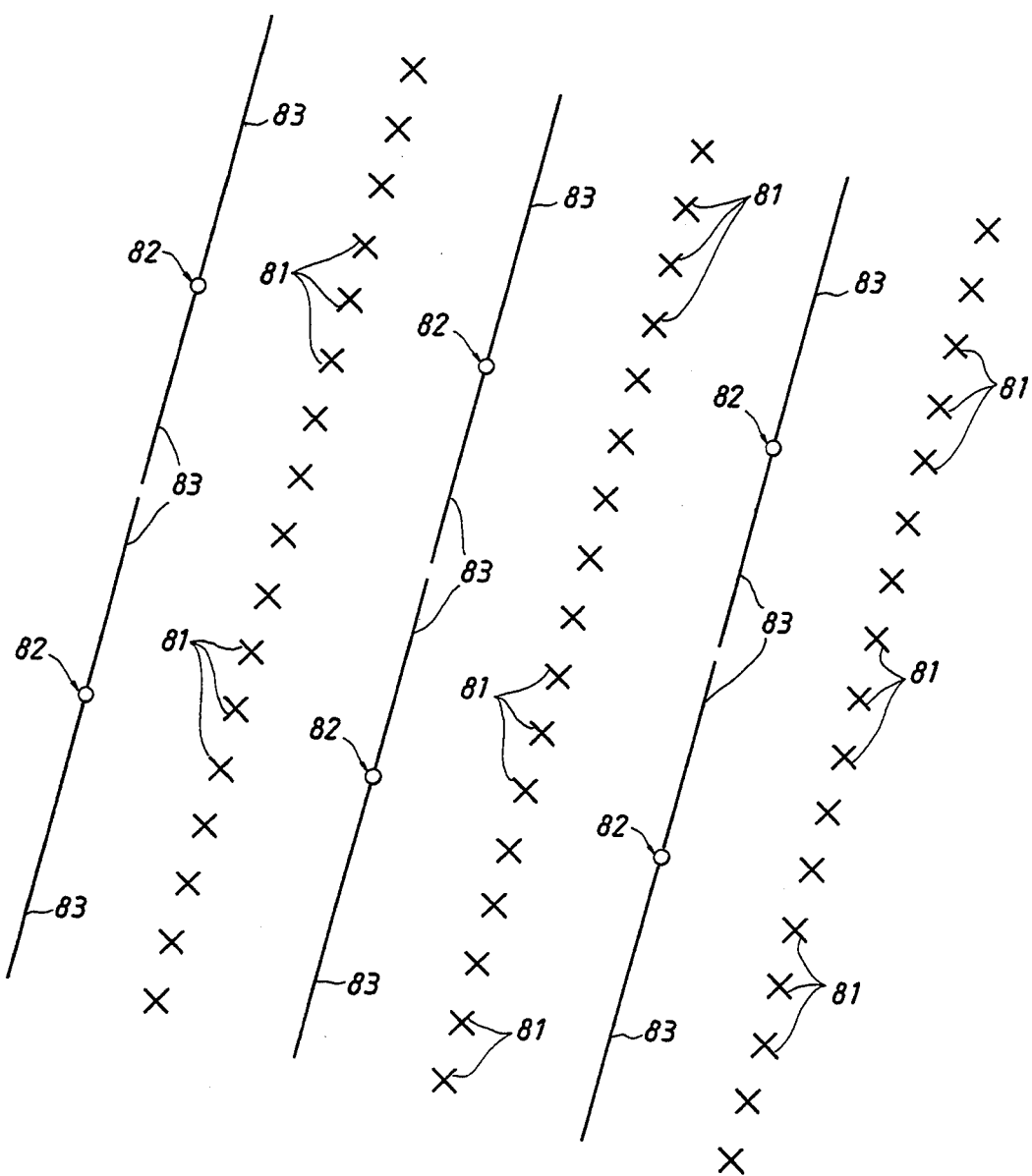
FIG. 8 is a plan view of a preferred well pattern for the practice of the present invention.

The well pattern used for estimates of FIGS. 7 and 8 included production wells placed in a 1.25 acre square pattern, the square pattern being at right angles with the direction of the minimum principal stress within the hydrocarbon containing formation. Production wells are therefore separated by about 330 feet. Optimal distances between production wells will vary significantly depending upon the size of fracture which can be imparted into the formation, the formation permeability, the cost of providing producer wells and the cost of providing fractures. Generally, the producer wells will be separated by between about 100 and about 300 feet. In the case of fractured producer wells, the fractures will generally be separated by about 100 to about 300 feet, and the fractures will extend to about the tips of the fractures from adjacent wells.

FIGS. 6 and 7 are based on heat injection wells situated in rows between the production wells, the rows being essentially perpendicular to the direction of the minimum principal stress of the formation. Seven heat injection wells are provided for each production well. Heat injectors are therefore about 47 feet apart. The formation properties were assumed to be similar to those of a diatomite formation.

Heat injection wells will generally be more than about 15 feet apart, and preferably about 20 to about 100 feet apart. Greater separation results in a slow recovery of oil from the formation whereas closer spacing results in excessive heat injector initial investment. Because heat transfer from the heat injection well in the vicinity of the injection well generally limits the rate of heat injection, more heat injection wells than producer wells are generally provided. Typically, about two to about nine heat injection wells will be provided for each producer well. For a diatomite formation, about six to about seven heat injection wells per producer well are preferred.

FIGS. 6 and 7 are based on the formation being fractured from the production wells, creating fractures that run essentially parallel to the rows of heat injection wells. When the hydrocarbon containing formation has a permeability of less than about 20 mdarcys, the formation is preferably fractured from the production wells.

Fracturing of production wells in this heat injection process is another inventive aspect of the present process. Typically, thermal recovery processes will significantly increase compressive forces in formation rocks due to thermal expansion of the rocks. This increase in compressive forces will typically close fractures. Diatomite rocks behave differently. Heating the diatomite rocks to temperatures above about 150° C. will result in some shrinkage of the rock. This shrinkage is most pronounced between about 900° C. and about 1000° C., but is evident at considerably lower temperatures. This shrinkage indicates that fractures within diatomite formations, if open when heat injection is initiated, will tend to stay open as the formation is heated. Open fractures increases the surface area through which recovered hydrocarbons cad pass to enter the production wellbore. Arrangement of rows of heat injection wells between fractures minimizes the distance recovered hydrocarbons must travel before being captured by the production well.

The present invention can also be advantageously applied to oil shale formations that are relatively shallow. Like most formations, other than diatomite, lateral stresses in oil shale formations may increase as the formations are heated, but most oil shale is found in relatively shallow formations.

The minimum stress in a formation that is within about 1500 feet of the surface is typically vertical due to the lower weight of overburden. Shallow oil shale formations, therefore, fracture horizontally. Vertical stresses are generally limited by the overburden weight, and therefore do not increase as the formations are heated. A shallow oil shale formation can, therefore, be fractured horizontally and heat injection wells drilled horizontally parallel to the fractures according to the present invention. The production wells could be vertical or horizontal.

Oil shale formations typically comprise layered strata with varying oil content. When horizontal heat injection wells are placed in an oil shale formation, they are most preferably placed near a strata having a relatively high oil content. These heat injections could eventually heat a large portion of the formation, but placement near a strata having a high oil content can significantly increase early oil production.

For FIGS. 6 and 7, heat was assumed to be transferred from a borehole with an effective radius of five inches. Diatomite sintering and the use of highly heat conductive cement in the borehole generates a relatively highly heat conductive zone around the borehole. This zone is sixteen inches in diameter for the 1093° C. and 1371° C. cases. It is 12 inches in diameter for the 815° C. case due to the lesser extent of sintering at this lower temperature. The smaller zone of relatively high heat conductivity along with the lower temperature level of heat injection contribute to the lower and slower oil recoveries for the 815° C. case.

The oil-containing formation was a diatomite formation having an initial porosity of about 50% and an initial water content of about twenty percent by volume. Oil in the formation was 28 gravity crude oil. The heat injector wellbores assumed for FIGS. 6 and 7 were of sixteen inches in diameter with the annulus between the burner and the formation filled with a cement that has a heat conductivity of four times the heat conductivity of diatomite. The heat conductivity of the diatomite formation was assumed to be about $2.3 \times 10^{-3}$ cal/(cm-sec-C). The formation was sufficiently thick that heat losses from the top and bottom of the formation are negligible.

Heat injection begins at time equal to zero in FIGS. 6 and 7. These cases represent, respectively, prior art temperature level of heat injection, high temperature metal alloy burners, and very high temperature ceramic type burners. The three cases are represented on FIG. 6 by lines A, B and C respectively. It can be seen from FIG. 6 that initial oil production begins between about two and three years from initial heat injection for the latter two cases. Production is essentially complete after about thirteen and ten years for the 1093° C. and 1371° C. cases respectively. The 815° C. case does not begin to produce significant amounts of oil until heat has been injected for about seven years and takes more than twenty years to produce the formation oil.

FIG. 7 is a plot of the heat injection rates required to achieve the three cases described above. It can be seen that heat injection rates must be decreased over time as the formation near the wellbore becomes hotter. Average rates of heat injection are about 500 watts per foot for the 1371° C. case, about 400 watts per foot for the 1093° C. case and about 155 watts per foot for the 815° C. case.

At temperatures above about 900° C. diatomite rock sinters, decreasing its porosity and increasing its grain density. This results in an increased bulk density, thermal conductivity, and strength. This phenomenon occurs near the wellbore and causes an enhanced heat injectivity in the practice of the present invention. The very high temperatures also increase the hydrogen content in the near wellbore region which further improves the thermal conductivity.

Heating diatomite rock to temperatures between about 200° C. and 500° C. does not cause sintering but increases the Young's modulus of the rock by a factor of 2 to 3. This takes place in most of the formation by the end of the heat injection phase of the present process.

The overall strengthening of the rock resulting from the present process results in reduced subsidence when the pore pressure drops due to continued fluid withdrawals.

Considerably more capital investment can be justified based on the expected oil production of the 1371° C. and 1093° C. cases than the 815° C. case due to the long time period before oil production is realized in the latter case.

Referring to FIG. 8, a plan view of a preferred well pattern for the practice of the present invention is shown. Heat injection wells, 81, are shown in rows along a vertical plane of minimum stress within a hydrocarbon-bearing formation. Oil production wells, 82, are spaced at about uniform intervals between the rows of heat injection wells. The productions wells have been fractured by known hydraulic fracturing means forming fractures, 83, from the wellbores. The fractures preferably extend in tip to tip fashion. The heat injection wells, could in a further refinement, be staggered along a line between the oil production wells. Staggering the heat injection wells increases the distance between the heat injection wells and therefore decreases the effect of one on another early in the process of heating the formation.

Although the attached Figures show heat injectors cemented into the diatomite formation, diatomite will close around a heat injector due to the formation stresses and the softness of the diatomite. Cement can, therefore, be eliminated within the diatomite formation. The diatomite that closes up around the heat injector will sinter upon operation of the heat injector, thereby greatly improving the heat transfer properties of this diatomite. This sintering process is enhanced by maximizing the temperature to which the diatomite is exposed, even if for only a short time period. The heater may, therefore, be operated for a time period of about one to four weeks to heat the diatomite initially, and then operated for a time period of one day to one week at a very high temperature. This very high temperature may exceed the temperature at which the heater could be operated for a long time period, but not so high as to lead to a failure in the shorter time period. After the shorter period, the heater temperature may be lowered to a temperature at which the heater could be expected to operate for an extended time period.

The present invention is also advantageously applied to shallow formations such as some oil shale formations and diatomite formations. Many oil shale and diatomite formations are relatively shallow, and therefore have a near vertical plane of minimum formation stress. Shallow formations, as the term is used herein, refers to formations, or portions of formations, which have a minimum formation insitu stress that is nearly vertical. This will typically occur in formations below less than about 500 feet of overburden. Wellbores that are essentially perpendicular to the minimum formation stress would therefore be horizontal in such shallow formations. Providing horizontal fractured production wells and horizontal heat injection wellbores above and below, in a planes parallel to the fractures could enable economic production of relatively thin oil shale formations.

Horizonal heaters could also be utilized to achieve relatively rapid production of the richest layers in a formation by placing horizonal heat injection wells along the rich strata. A relativly thin rich strata could be heated by few long horizonal heaters compared to the number of vertical heaters that would be required. The horizonal heat injection wells could be used whether the minimal formation stress is vertical or horizonal.

The preferred embodiments of the present invention described above are exemplary, and reference to the appended claims is necessary to determine the scope of the present invention.

We claim:

1. A process to recover oil from a subterranean diatomite or oil shale formation, the process comprising the steps of:

providing heat injection means extending essentially through the formation, the heat injection means effective to provide heat in at least one plane, the plane being essentially perpendicular to the direction of the minimum principal stress;

providing production wells extending into the formation;

fracturing the formation from the production wells;

injecting heat into the formation from the heat injection means thereby driving hydrocarbons away from the heat injection means and toward the production wells; and producing from the production wells hydrocarbons that have been driven away from the heat injection means wherein the heat injection means comprise a plurality of heat injection wellbores provided along a plane perpendicular to the minimum formation stress, and the plurality of oil production wells are provided on each side of the plane which contains the heat injection wellbores.

2. The process of claim 1 wherein the formation is a diatomite formation.

3. The process of claim 2 wherein the heat injection means comprises a gas fueled heater and the fuel burned within the gas fueled heater contains a carbon suppressant agent in an amount effective to prevent carbon from forming within the heat injection means.

4. The process of claim 3 wherein the carbon suppressant agent is carbon dioxide.

5. The process of claim 4 wherein the fuel gas is essentially methane and the carbon dioxide to methane molar ratio is at least about 1:1.

6. The process of claim 3 wherein the carbon suppressant agent is water vapor.

7. The process of claim 4 wherein the gas being combusted is essentially methane and the water vapor to methane molar ratio is at least about 1.15:1.

8. The process of claim 1 wherein the ratio of the number of heat injection wellbores to the number of oil production wells is greater than about 2:1.

9. The process of claim 1 wherein the heat injection means comprise horizonal heaters.

10. The process of claim 9 wherein the direction of the minimum principal stress is essentially vertical.

11. An apparatus to recover hydrocarbons from a subterranean diatomite or oil shale formation, the apparatus comprising:

a) a hydraulically fractured production well;

b) a plurality of heat injection wellbores extending from a surface wellhead to within the formation;

c) a gas fired burner within the heat injection wellbores, the fuel gas fired burners capable of heating the formation adjacent to the heat injection wellbores wherein combustion is distributed over the length of the heat injection wellbores within the formation;

d) a means to provide a gas composition for combustion within the gas fired burner that does not form carbon deposits wherein the gas fired burner comprises a conduit within the wellbores for directing a flow of combustion air to a lower portion of the wellbores, a conduit within the wellbores for directing a fuel gas to a plurality of release points where a portion of the fuel gas mixes with combustion gas rising from the lower portion of the wellbores, and a conduit within the wellbores for directing combustion gases from the lower portion of the wellbore to the surface wellhead that is in communication with the combustion air conduit in the lower portion of the wellbores.

12. The apparatus of claim 11 wherein the subterranean formation is a diatomite formation.

13. The apparatus of claim 11 wherein the conduits are ceramic tubes.

14. The apparatus of claim 11 wherein the conduits are made of a high temperature metal.

15. The apparatus of claim 11 wherein a fuel gas conduit is in each of the combustion air conduit and the combustion gas conduit.

16. The apparatus of claim 11 wherein the combustion gas conduit and the combustion air conduit are voids within high alumina wellbore cement.

17. The apparatus of claim 11 wherein the combustion gas conduit is stacked annular-shaped ceramic bricks.

18. The apparatus of claim 11 wherein the fuel gas conduit is within the combustion air conduit, and combustion occurs as the gases pass toward the lower portion of the wellbore and the combustion gas conduit is an annulus surrounding the combustion air conduit.

19. The apparatus of claim 11 wherein the hydrocarbon-bearing formation is an oil shale formation.

20. The apparatus of claim 13 wherein the combustion gas conduit, combustion air conduit and the fuel gas conduit are concentric.

* * * * *